United States Patent
Ding et al.

(10) Patent No.: US 11,839,869 B2
(45) Date of Patent: Dec. 12, 2023

(54) PREPARATION METHOD OF NI ACTIVE SITE-LOADED C—SI AEROGEL CATALYST, AND PRODUCT AND USE THEREOF

(71) Applicant: TIANJIN UNIVERSITY, Tianjin (CN)

(72) Inventors: Hui Ding, Tianjin (CN); Dan Zhao, Tianjin (CN); Rui Liu, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 17/699,375

(22) Filed: Mar. 21, 2022

(65) Prior Publication Data

US 2023/0076533 A1  Mar. 9, 2023

(30) Foreign Application Priority Data

Aug. 27, 2021 (CN) .......................... 202110992592.X

(51) Int. Cl.
| | |
|---|---|
| *B01J 23/755* | (2006.01) |
| *B01J 21/18* | (2006.01) |
| *B01J 35/04* | (2006.01) |
| *B01J 37/02* | (2006.01) |
| *B01J 37/04* | (2006.01) |
| *B01J 37/08* | (2006.01) |
| *B01J 37/34* | (2006.01) |

(52) U.S. Cl.
CPC ............. *B01J 23/755* (2013.01); *B01J 21/18* (2013.01); *B01J 35/04* (2013.01); *B01J 37/0201* (2013.01); *B01J 37/04* (2013.01); *B01J 37/082* (2013.01); *B01J 37/343* (2013.01)

(58) Field of Classification Search
CPC . B01J 23/755; B01J 21/18; B01J 35/04; B01J 37/0201; B01J 37/04; B01J 37/082; B01J 37/343; B01J 37/0018; B01J 37/036
See application file for complete search history.

(56) References Cited

U.S. PATENT DOCUMENTS

2009/0247655 A1* 10/2009 Kim ...................... C01B 33/159
521/64

FOREIGN PATENT DOCUMENTS

| CN | 108704636 A | * | 10/2018 |
| CN | 112206780 A | * | 1/2021 |

OTHER PUBLICATIONS

Luo et al. Journal of Non-Crystalline Solids 2019, 503-504, 214-223 (Year: 2019).*
Wang et al. Fuel 2020, 268, 117384 (Year: 2020).*
Gash et al. Journal of Non-Crystalline Solids 2004, 350, 145-151 (Year: 2004).*
Xu et al. Microporous and Mesoporous Materials 2012, 148, 145-151 (Year: 2012).*
Jiao et al. CN112206780A English Translation (Year: 2021).*
Ding et al. CN108704636A English Translation (Year: 2018).*

* cited by examiner

*Primary Examiner* — Anthony J Zimmer
*Assistant Examiner* — Jordan W Taylor
(74) *Attorney, Agent, or Firm* — CROWE & DUNLEVY

(57) ABSTRACT

The present disclosure discloses a method of preparing a Ni active site-loaded C—Si aerogel catalyst, and a product and use thereof, belonging to the technical field of catalyst preparation. The method includes the following steps: (1) dissolving absolute ethanol, trimethoxymethylsilane, cetyltrimethylammonium bromide and HCl in deionized water, conducting hydrolysis to obtain a hydrolyzate, followed by adjusting a pH value of the hydrolyzate to 7 to 8.5, and drying to obtain a C—Si aerogel; and (2) in the absolute ethanol, mixing $NiCl_2 \cdot 6H_2O$ with the C—Si aerogel obtained in step (1) uniformly, and conducting ultrasonication, impregnation and drying, followed by calcination to obtain the Ni active site-loaded C—Si aerogel catalyst. In the present disclosure, the prepared Ni active site-loaded C—Si aerogel catalyst is capable of conducting catalytic degradation of aromatic volatile organic compounds (VOCs) at room temperature.

6 Claims, No Drawings

PREPARATION METHOD OF NI ACTIVE SITE-LOADED C—SI AEROGEL CATALYST, AND PRODUCT AND USE THEREOF

CROSS REFERENCE TO RELATED APPLICATION

This patent application claims the benefit and priority of Chinese Patent Application No. 202110992592.X, filed on Aug. 27, 2021, the disclosure of which is incorporated by reference herein in its entirety as part of the present application.

TECHNICAL FIELD

The present disclosure relates to the technical field of catalyst preparation, in particular to a method of preparing a Ni active site-loaded C—Si aerogel catalyst, and a product and use thereof.

BACKGROUND ART

Volatile organic compounds (VOCs), as precursors that form photochemical smog and haze, are a major class of air pollutants. Aromatic VOCs are the most common type of VOCs, including the large amounts of benzene, toluene and xylene emitted by various industries, with toxicity and carcinogenicity that seriously threatening the human health. Therefore, it is an urgent matter of management of aromatic VOCs.

At present, VOCs treatment methods mainly include adsorption methods, absorption methods, condensation methods, catalytic combustion methods, plasma methods, photocatalysis methods and ozone oxidation methods. Among many VOCs treatment technologies, catalytic oxidation technology is regarded as the most promising VOCs treatment technology. Currently, there are no reports on catalysts loading Ni active sites on C—Si aerogels, which can reduce the activation energy of the reaction and increase the reaction rate to achieve the catalytic oxidation and degradation of aromatic VOCs at room temperature without external energy input.

Many scientific research institutions have done a lot of research on doping metal nanoparticles in carbon aerogels to expand the multifunctional application of carbon aerogel materials, which is to improve the structure, catalytic performance and electrical conductivity of the carbon aerogels. At present, the C—Si aerogel has high density and small pore size, making it easy to agglomerate metal atoms when the C—Si aerogel is doped with metal nanoparticles, thus affecting the utilization of atoms.

SUMMARY

A purpose of the present disclosure is to provide a method for preparing a Ni active site-loaded C—Si aerogel catalyst, and a product and use thereof, thereby solving the problems existing in the prior art. Therefore, the activation energy of a catalytic reaction is reduced to increase a reaction rate, thereby achieving the catalytic oxidation and degradation of aromatic VOCs at room temperature without external energy input.

To achieve the above objective, the present disclosure provides the following technical solutions.

The present disclosure provides a method of preparing a Ni active site-loaded C—Si aerogel catalyst, including the following steps:

(1) dissolving absolute ethanol, trimethoxymethylsilane and cetyltrimethylammonium bromide in deionized water, adjusting the pH value to 3.5 to 5 with HCl, and conducting hydrolysis to obtain a hydrolyzate, followed by adjusting a pH value of the hydrolyzate to 7 to 8.5, and drying to obtain a C—Si aerogel; and (2) in the absolute ethanol, mixing $NiCl_2.6H_2O$ with the C—Si aerogel obtained in step (1) uniformly, and conducting ultrasonication, impregnation and drying, followed by calcination to obtain the Ni active site-loaded C—Si aerogel catalyst.

Further, in step (2), a method of mixing the $NiCl_2.6H_2O$ and the C—Si aerogel obtained in the step (1) may specifically include: mixing the C—Si aerogel obtained in step (1) with the absolute ethanol according to a mass-to-volume ratio of 1 g:10 mL, and stirring evenly to obtain a solution 1; mixing the $NiCl_2$ $6H_2O$ with the absolute ethanol according to a mass-volume ratio of (0.01-0.06) g:10 mL, and stirring evenly to obtain a solution 2; and mixing the solution 1 and the solution 2 uniformly according to a volume ratio of 1:1.

Further, in step (2), the ultrasonication may be conducted for 25 min to 35 min.

Further, in step (2), the impregnation may be conducted at 65° C. to 75° C. for 3 h to 5 h.

Further, in step (2), the calcination may be conducted at 200° C. to 400° C. for 1.5 h to 3 h with a heating rate of 3° C./min.

Further, in step (1), a method of preparing the C—Si aerogel may specifically include:

(a) mixing the deionized water, the absolute ethanol, the trimethoxymethylsilane and the cetyltrimethylammonium bromide at a volume-to-mass ratio of (5-15) mL:(10-20) mL:(4-6) mL:(0.05-0.15) g, stirring well, adjusting the pH value to 3.5 to 5 with HCl, and conducting hydrolysis at 40° C. to 50° C. for 30 min to 60 min to obtain a hydrolyzate; and (b) adjusting the pH value of the hydrolyzate obtained in step (a) to 7 to 8.5, followed by standing at 55° C. to 65° C. for 3.5 h to 4.5 h, and drying to obtain the C—Si aerogel.

Further, in step (b), the drying may be conducted at 75° C. to 85° C. for 2 h to 2.5 h, then at 95° C. to 105° C. for 2 h to 2.5 h, and then at 115° C. to 125° C. for 1 h to 1.5 h.

The present disclosure further provides a Ni active site-loaded C—Si aerogel catalyst prepared by the preparation method.

The present disclosure further provides use of the Ni active site-loaded C—Si aerogel catalyst in catalytic degradation of aromatic VOCs at room temperature.

The present disclosure has the following technical effects:

(1) in the present disclosure, the C—Si aerogel is prepared with the absolute ethanol, the trimethoxymethylsilane and the cetyltrimethylammonium bromide as raw materials; the C—Si aerogel is dried by a gradient heating method; the prepared C—Si aerogel is porous and evenly distributed, with a low density and large pore size, which can avoid atomic agglomeration to a certain extent, thereby improving the dispersion of metal atoms to greatly improve the utilization of atoms.

(2) The C—Si aerogel has desirable adsorption characteristics for aromatic VOCs due to a large specific surface area, and can increase a contact time between the active site and aromatic VOCs to improve the degradation rate.

(3) In the present disclosure, staged heating is conducted during the drying of C—Si aerogel, such that liquid in the wet gel, mainly water and ethanol, can be slowly removed by heating. Meanwhile, the staged heating avoids a lengthy process of solvent exchange and surface modification before the drying, such that there is less liquid in the wet gel, resulting in a shortened drying time.

(4) The C—Si aerogel, as a bulk solid that is not easy to be blown away, can be used industrially on a large scale and repeatedly.

(5) In the present disclosure, an efficient Ni active site-loaded C—Si aerogel catalyst is constructed to reduce the reaction activation energy and increase the reaction rate to achieve catalytic oxidation and degradation of the aromatic VOCs at room temperature without external energy input, such that the aromatic VOCs can be degraded into $CO_2$ and $H_2O$ at room temperature, reducing energy consumption.

DETAILED DESCRIPTION OF THE EMBODIMENTS

In the present disclosure, a plurality of exemplary examples are now described in detail. The detailed description should not be considered as a limitation to the present disclosure, but should be understood as a more detailed description of certain aspects, features, and implement solutions of the present disclosure.

It should be understood that terms described in the present disclosure are merely used to describe specific embodiments and are not intended to limit the present disclosure. In addition, for a numerical range in the present disclosure, it should be understood that each intermediate value between an upper limit and a lower limit of the range is also specifically disclosed. Each smaller range between any stated value or intermediate value in a stated range and any other stated value or intermediate value in the stated range is also included in the present disclosure. The upper and lower limits of these smaller ranges can independently be included or excluded from the range.

Unless otherwise stated, all technical and scientific terms used herein have the same meaning as commonly understood by those of ordinary skill in the art described in the present disclosure. Although the present disclosure describes only preferred methods and materials, any methods and materials similar or equivalent to those described herein can also be used in the practice or testing of the present disclosure. All documents mentioned in this specification are incorporated by reference to disclose and describe methods and/or materials related to the documents. In case of conflict with any incorporated documents, the content of this specification shall prevail.

It is evident to a person skilled in the art that a plurality of modifications and variations can be made to the specific embodiments of the present specification without departing from the scope or spirit of the present disclosure. Other embodiments derived from the description of the present disclosure will be evident to the skilled person. The specification and examples of the present disclosure are merely exemplary.

As used herein, "including", "having", "containing", and the like are all open-ended terms, which means including but not limited to.

Example 1

1. Preparation of a C—Si Aerogel (1) 10 mL of deionized water, 15 mL of absolute ethanol, 5 mL of trimethoxymethylsilane and 0.1 g of cetyltrimethylammonium bromide were added into a 100 mL beaker in turn, followed by stirring uniformly, and the pH value was adjusted to 4 with a 0.1 mol/L HCl to obtain a first solution.

(2) The first solution was placed in an oil bath pot at 45° C., followed by conducting hydrolysis for 30 min to obtain a hydrolyzate; $NH_3 \cdot H_2O$ with a concentration of 1 mol·$L^{-1}$ was added dropwise while stirring, followed by adjusting a pH value of the hydrolyzate to 7.5 to obtain a second solution.

(3) the oil bath pot was heated to 60° C., followed by standing the second solution for 4 h; the second solution was placed in an oven for baking at 80° C., 100° C. and 120° C. for 2 h, 2 h and 1 h, respectively; and the C—Si aerogel was obtained.

2. Loading of a Ni Active Site by Impregnation (1) 10 mL of the absolute ethanol was added to the beaker containing 1 g of the C—Si aerogel, followed by stirring to obtain a solution 1;

(2) 10 mL of the absolute ethanol was added to a beaker containing 0.045 g of $NiCl_2$ $6H_2O$, followed by stirring to obtain a solution 2;

(3) the solution 1 and the solution 2 were mixed, followed by conducting ultrasonication for 30 min; a mixture was placed in an oil bath pot for impregnation at 70° C. for 5 h, followed by baking in an oven at 80° C. for 2 h; and (4) calcination was conducted at 200° C. for 2 h in a muffle furnace at a heating rate of 3° C./min, to obtain a Ni active site-loaded C—Si aerogel catalyst capable of being used for catalytic degradation of aromatic VOCs at room temperature.

Example 2

1. Preparation of a C—Si Aerogel (1) 10 mL of deionized water, 15 mL of absolute ethanol, 5 mL of trimethoxymethylsilane and 0.1 g of cetyltrimethylammonium bromide were added into a 100 mL beaker in turn, followed by stirring uniformly, and the pH value was adjusted to 4.5 with a 0.1 mol/L HCl to obtain a first solution.

(2) The first solution was placed in an oil bath pot at 45° C., followed by conducting hydrolysis for 60 min to obtain a hydrolyzate; $NH_3 \cdot H_2O$ with a concentration of 1 mol·$L^{-1}$ was added dropwise while stirring, followed by adjusting a pH value of the hydrolyzate to 7.5 to obtain a second solution.

(3) the oil bath pot was heated to 60° C., followed by standing the second solution for 4 h; the second solution was placed in an oven for baking at 80° C., 100° C. and 120° C. for 2 h, 2 h and 1 h, respectively; and the C—Si aerogel was obtained.

2. Loading of a Ni Active Site by Impregnation (1) 10 mL of the absolute ethanol was added to the beaker containing 1 g of the C—Si aerogel, followed by stirring to obtain a solution 1;

(2) 10 mL of the absolute ethanol was added to a beaker containing 0.03 g of $NiCl_2 \cdot 6H_2O$, followed by stirring to obtain a solution 2;

(3) the solution 1 and the solution 2 were mixed, followed by conducting ultrasonication for 30 min; a mixture was placed in an oil bath pot for impregnation at 70° C. for 5 h, followed by baking in an oven at 80° C. for 3 h; and (4) calcination was conducted at 300° C. for 2 h in a muffle furnace at a heating rate of 3° C./min, to obtain a Ni active site-loaded C—Si aerogel catalyst capable of being used for catalytic degradation of aromatic VOCs at room temperature.

Example 3

1. Preparation of a C—Si Aerogel (1) 15 mL of deionized water, 20 mL of absolute ethanol, 6 mL of trimethoxymethylsilane and 0.15 g of cetyltrimethylammonium bromide were added into a 100 mL beaker in turn, followed by stirring uniformly, and the pH value was adjusted to 5 with a 0.1 mol/L HCl to obtain a first solution.

(2) The first solution was placed in an oil bath pot at 50° C., followed by conducting hydrolysis for 60 min to obtain a hydrolyzate; $NH_3 \cdot H_2O$ with a concentration of 1 $mol \cdot L^{-1}$ was added dropwise while stirring, followed by adjusting a pH value of the hydrolyzate to 7 to obtain a second solution.

(3) the oil bath pot was heated to 65° C., followed by standing the second solution for 4.5 h; the second solution was placed in an oven for baking at 85° C., 105° C. and 125° C. for 2 h, 2 h and 1 h, respectively; and the C—Si aerogel was obtained.

2. Loading of a Ni Active Site by Impregnation (1) 10 mL of the absolute ethanol was added to the beaker containing 1 g of the C—Si aerogel, followed by stirring to obtain a solution 1;

(2) 10 mL of the absolute ethanol was added to a beaker containing 0.045 g of $NiCl_2$ $6H_2O$, followed by stirring to obtain a solution 2;

(3) the solution 1 and the solution 2 were mixed, followed by conducting ultrasonication for 25 min; a mixture was placed in an oil bath pot for impregnation at 75° C. for 3 h, followed by baking in an oven at 80° C. for 4 h; and (4) calcination was conducted at 400° C. for 2 h in a muffle furnace at a heating rate of 3° C./min, to obtain a Ni active site-loaded C—Si aerogel catalyst capable of being used for catalytic degradation of aromatic VOCs at room temperature.

Example 4

1. Preparation of a C—Si Aerogel (1) 10 mL of deionized water, 15 mL of absolute ethanol, 5 mL of trimethoxymethylsilane and 0.1 g of cetyltrimethylammonium bromide were added into a 100 mL beaker in turn, followed by stirring uniformly, and the pH value was adjusted to 4.5 with a 0.1 mol/L HCl to obtain a first solution.

(2) The first solution was placed in an oil bath pot at 45° C., followed by conducting hydrolysis for 60 min to obtain a hydrolyzate; $NH_3 \cdot H_2O$ with a concentration of 1 $mol \cdot L^{-1}$ was added dropwise while stirring, followed by adjusting a pH value of the hydrolyzate to 8 to obtain a second solution.

(3) the oil bath pot was heated to 60° C., followed by standing the second solution for 4 h; the second solution was placed in an oven for baking at 80° C., 100° C. and 120° C. for 2 h, 2 h and 1 h, respectively; and the C—Si aerogel was obtained.

2. Loading of a Ni Active Site by Impregnation (1) 10 mL of the absolute ethanol was added to the beaker containing 1 g of the C—Si aerogel, followed by stirring to obtain a solution 1;

(2) 10 mL of the absolute ethanol was added to a beaker containing 0.06 g of $NiCl_2$ $6H_2O$, followed by stirring to obtain a solution 2;

(3) the solution 1 and the solution 2 were mixed, followed by conducting ultrasonication for 30 min; a mixture was placed in an oil bath pot for impregnation at 70° C. for 5 h, followed by baking in an oven at 80° C. for 3 h; and (4) calcination was conducted at 400° C. for 2 h in a muffle furnace at a heating rate of 3° C./min, to obtain a Ni active site-loaded C—Si aerogel catalyst capable of being used for catalytic degradation of aromatic VOCs at room temperature.

Example 5

1. Preparation of a C—Si Aerogel (1) 5 mL of deionized water, 10 mL of absolute ethanol, 4 mL of trimethoxymethylsilane and 0.05 g of cetyltrimethylammonium bromide were added into a 100 mL beaker in turn, followed by stirring uniformly, and the pH value was adjusted to 3.5 with HCl to obtain a first solution.

(2) The first solution was placed in an oil bath pot at 45° C., followed by conducting hydrolysis for 40 min to obtain a hydrolyzate; $NH_3 \cdot H_2O$ with a concentration of 1 $mol \cdot L^{-1}$ was added dropwise while stirring, followed by adjusting a pH value of the hydrolyzate to 8.5 to obtain a second solution.

(3) the oil bath pot was heated to 55° C., followed by standing the second solution for 3.5 h; the second solution was placed in an oven for baking at 75° C., 95° C. and 115° C. for 2.5 h, 2.5 h and 1.5 h, respectively; and the C—Si aerogel was obtained.

2. Loading of a Ni Active Site by Impregnation (1) 10 mL of the absolute ethanol was added to the beaker containing 1 g of the C—Si aerogel, followed by stirring to obtain a solution 1;

(2) 10 mL of the absolute ethanol was added to a beaker containing 0.01 g of $NiCl_2$ $6H_2O$, followed by stirring to obtain a solution 2;

(3) the solution 1 and the solution 2 were mixed, followed by conducting ultrasonication for 25 min; a mixture was placed in an oil bath pot for impregnation at 65° C. for 3 h, followed by baking in an oven at 80° C. for 2 h; and (4) calcination was conducted at 300° C. for 1.5 h in a muffle furnace at a heating rate of 3° C./min, to obtain a Ni active site-loaded C—Si aerogel catalyst capable of being used for catalytic degradation of aromatic VOCs at room temperature.

Experimental Example 1

A calcination temperature of step (4) was set to 150° C., 200° C., 300° C., 400° C., and 450° C., respectively, other operations were the same as those in Example 1, and an optimization experiment was conducted. The experimental results are shown in Table 1. It can be seen from Table 1 that when the calcination temperature is 200° C. to 400° C., the dispersion of Ni active components can be significantly improved, and the particle size of Ni active components can be significantly reduced.

TABLE 1

| Calcination temperature | Ni active component dispersion, % | Ni active component particle size, % |
| --- | --- | --- |
| 150° C. | 24.9 | 5.6 |
| 200° C. | 48.0 | 2.6 |
| 300° C. | 53.1 | 2.2 |
| 400° C. | 49.3 | 2.5 |
| 450° C. | 51.8 | 2.3 |

Experimental Example 2

A volume ratio of absolute ethanol and trimethoxymethylsilane was adjusted to 10:1, 10:2, 10:4, 10:6 and 10:7, respectively, other operations were the same as those in Example 1, and an optimization experiment was conducted. The experimental results are shown in Table 2. It can be seen from Table 2 that: when the volume ratio of absolute ethanol and trimethoxymethylsilane is 10:2, the dispersion of Ni active component begins to be significantly improved, and the particle size of Ni active component also begins to be significantly reduced; when the volume ratio of absolute ethanol and trimethoxymethylsilane is 10:7, the dispersion of Ni active component begins to be decreased, and the particle size of Ni active component also begins to be increased. This shows that when the volume ratio of absolute ethanol and trimethoxymethylsilane is 10:2 to 10:6, the dispersion of Ni active component can be significantly improved, and the particle size of Ni active component can be significantly reduced.

TABLE 2

| Volume ratio of absolute ethanol and trimethoxymethylsilane | Ni active component dispersion, % | Ni active component particle size, % |
|---|---|---|
| 10:1 | 17.8 | 6.8 |
| 10:2 | 46.2 | 2.8 |
| 10:4 | 52.7 | 2.3 |
| 10:6 | 50.9 | 2.5 |
| 10:7 | 47.6 | 2.7 |

Comparative Example 1

A method was the same as that in Example 1, except that in step (3) of preparation of a C—Si aerogel, drying was conducted at 80° C. for 5 h.

In the comparative example, the prepared C—Si aerogel has a density of 0.037 g/cm$^3$ and an average pore size of 1,100 nm.

Comparative Example 2

A method was the same as that in Example 1, except that in step (3) of preparation of a C—Si aerogel, drying was conducted at 120° C. for 5 h.

In the comparative example, the prepared C—Si aerogel has a density of 0.031 g/cm$^3$ and an average pore size of 1,300 nm.

Table 3 shows the content, dispersion and particle size of Ni active components in the Ni active site-loaded C—Si aerogel catalysts prepared in Example 1-5 and Comparative Example 1-2.

TABLE 3

| Examples | Ni active component content, % | Ni active component dispersion, % | Ni active component particle size, % | Density of C—Si aerogel, g/cm$^3$ | Average pore size of C—Si aerogel, nm |
|---|---|---|---|---|---|
| Example 1 | 1.57 | 53.1 | 2.2 | 0.008 | 2600 |
| Example 2 | 1.32 | 49.5 | 2.6 | 0.009 | 2300 |
| Example 3 | 1.18 | 43.9 | 2.9 | 0.010 | 1900 |
| Example 4 | 1.22 | 48.7 | 2.7 | 0.095 | 2000 |
| Example 5 | 0.86 | 39.7 | 3.0 | 0.014 | 1700 |
| Comparative Example 1 | 0.71 | 15.8 | 6.8 | 0.037 | 1100 |
| Comparative Example 2 | 0.79 | 18.2 | 7.0 | 0.031 | 1300 |

Effect Test

The catalysts of Examples 1-5 and Comparative Examples 1-2 were installed in a fixed-bed reaction device, and catalytic evaluation was conducted using benzene, toluene and p-xylene as evaluation pollutants of a catalytic reaction. The catalysts were tested in a quartz tube with an inner diameter of 8 mm. The catalytic reaction device has a length of 40 mm, the VOCs have a solubility of 800 mg·m$^{-3}$, a space velocity was 70,000 mL·g$^{-1}$·h$^{-1}$, and a reaction temperature was 25° C. The catalytic oxidation was conducted in the presence of oxygen. The results are shown in Table 4. It can be seen from Table 4 that the highly dispersed Ni active site-loaded C—Si aerogel catalysts prepared in Examples 1-5 have a desirable removal effect on the benzene, toluene and p-xylene. Therefore, the catalyst can be used to completely remove the aromatic VOCs at room temperature.

TABLE 4

| Examples | Benzene removal rate (%) | Toluene Removal rate (%) | P-xylene removal rate (%) |
|---|---|---|---|
| Example 1 | 100% | 100% | 99.8% |
| Example 2 | 96.3% | 92.4% | 94.8% |
| Example 3 | 96.1% | 98.3% | 95.7% |
| Example 4 | 98.8% | 95.0% | 97.5% |
| Example 5 | 94.7% | 86.7% | 93.9% |
| Comparative Example 1 | 80.4% | 76.7% | 78.1% |
| Comparative Example 2 | 78.3% | 76.0% | 75.9% |

The foregoing embodiments are only intended to describe the preferred implementation of the present disclosure and not intended to limit the scope of the present disclosure. Various alterations and improvements made by a person of ordinary skill in the art based on the technical solution of the present disclosure without departing from the design spirit of the present disclosure shall fall within the protection scope determined by the claims of the present disclosure.

What is claimed is:

1. A method of preparing a Ni active site-loaded C—Si aerogel catalyst, comprising the steps of:
   (1) dissolving absolute ethanol, trimethoxymethylsilane and cetyltrimethylammonium bromide in deionized water, adjusting a pH value to 3.5 to 5 with HCl, conducting hydrolysis to obtain a hydrolyzate, adjusting a pH value of the hydrolyzate to 7 to 8.5, and drying to obtain a C—Si aerogel; and
   (2) in the absolute ethanol, mixing NiC$_2$.6H$_2$O with the C—Si aerogel obtained in step (1) uniformly, and conducting ultrasonication, impregnation and drying, followed by calcination to obtain the Ni active site-loaded C—Si aerogel catalyst;
   wherein in step (1), the C—Si aerogel is obtained by a process, comprising:
   (a) mixing the deionized water, the absolute ethanol, the trimethoxymethylsilane and the cetyltrimethylammonium bromide at a volume-to-mass ratio of (5-15) mL: (10-20) mL: (4-6) mL: (0.05-0.15) g, stirring well, adjusting the pH value to 3.5 to 5 with HCl, and conducting hydrolysis at 40° C. to 50° C. for 30 min to 60 min to obtain a hydrolyzate; and
   (b) adjusting the pH value of the hydrolyzate obtained in step (a) to 7 to 8.5, followed by standing at 55° C. to 65° C. for 3.5 h to 4.5 h, and drying to obtain the C—Si aerogel;

wherein in step (b), the drying is conducted at 75° C. to 85° C. for 2 h to 2.5 h, then at 95° C. to 105° C. for 2 h to 2.5 h, and finally at 115° C. to 125° C. for 1 h to 1.5 h.

2. The method according to claim 1, wherein in step (2), mixing the $NiCl_2.6H_2O$ and the C—Si aerogel obtained in the step (1) comprises: mixing the C—Si aerogel obtained in step (1) with the absolute ethanol according to a mass-to-volume ratio of 1 g: 10 mL, and stirring evenly to obtain a first solution; mixing the $NiCl_2.6H_2O$ with the absolute ethanol according to a mass-volume ratio of (0.01-0.06) g: 10 mL, and stirring evenly to obtain a second solution; and mixing the first solution and the second solution uniformly according to a volume ratio of 1:1.

3. The method according to claim 1, wherein in step (2), the ultrasonication is conducted for 25 min to 35 min.

4. The method according to claim 1, wherein in step (2), the impregnation is conducted at 65° C. to 75° C. for 3 h to 5 h.

5. The method according to claim 1, wherein in step (2), the calcination is conducted at 200° C. to 400° C. for 1.5 h to 3 h with a heating rate of 3° C./min.

6. A method of preparing a Ni active site-loaded C—Si aerogel catalyst, comprising the steps of:

(1) dissolving absolute ethanol, trimethoxymethylsilane and cetyltrimethylammonium bromide in deionized water, adjusting a pH value to 3.5 to 5 with HCl, conducting hydrolysis to obtain a hydrolyzate, adjusting a pH value of the hydrolyzate to 7 to 8.5, and drying to obtain a C—Si aerogel; and (2) in the absolute ethanol, mixing $NiCl_2.6H_2O$ with the C—Si aerogel obtained in step (1) uniformly, and conducting ultrasonication, impregnation and drying, followed by calcination to obtain the Ni active site-loaded C—Si aerogel catalyst;

wherein in step (2), mixing the $NiCl_2.6H_2O$ with the C—Si aerogel obtained in the step (1) comprises: mixing the C—Si aerogel obtained in step (1) with the absolute ethanol according to a mass-to-volume ratio of 1 g: 10 mL, and stirring evenly to obtain a first solution; mixing the $NiCl_2.6H_2O$ with the absolute ethanol according to a mass-volume ratio of (0.01-0.06) g: 10 mL, and stirring evenly to obtain a second solution; and mixing the first solution and the second solution uniformly according to a volume ratio of 1:1.

* * * * *